United States Patent Office 3,640,945
Patented Feb. 8, 1972

3,640,945
THERMAL STABILITY OF COPOLYMERS OF TRIOXANE
Ernst Ricker, Frankenthal, and Franz Schmidt and Erich Schwartz, Mannheim, Germany, assignors to Badische Anilin- & Soda-Fabrik Aktiengesellschaft, Ludwigshafen (Rhine), Germany
No Drawing. Filed Oct. 1, 1968, Ser. No. 764,335
Claims priority, application Germany, Oct. 10, 1967,
P 17 20 309.7, P 17 20 311.1
The portion of the term of the patent subsequent to Nov. 1, 1983, has been disclaimed
Int. Cl. C08g 1/22
U.S. Cl. 260—45.7                                10 Claims

ABSTRACT OF THE DISCLOSURE

A process for improving the thermal stability of copolymers of trioxane which contain at least 80% by weight of —O—CH$_2$— groups and distributed in the polymer chain in amounts of less than 20% by weight (with reference to the copolymer of

groupings by eliminating unstable portions of the chain by heating with aqueous solutions of alkali metal or alkaline earth metal fluorides.

---

The invention relates to a process for improving the thermal stability of copolymers of trioxane which contain at least 80% by weight of —O—CH$_2$— groups and distributed in the polymer chain in an amount of less than 20% by weight (with reference to the copolymer) of

groupings by eliminating unstable portions of the chain by heating with aqueous solutions.

It is known that copolymers having high thermal stability can be prepared by copolymerization of trioxane and compounds which are copolymerizable with trioxane and which in the copolymerization introduce along the polymer chain groups having at least two carbon atoms adjacent to each other in the carbon chain, particularly in the presence of cationic catalysts such as hydrofluoric acid, phosphorus pentafluoride, silicon tetrafluoride and preferably boron trifluoride or its coordination complexes.

Examples of groupings having at least two adjacent carbon atoms in the polymer chain are unsubstituted or substituted alkylene oxyalkylene or thialkylene groups such as oxyethylene, oxybutylene or oxybutenylene groups.

After the polymerization, the copolymers contain the acid polymerization catalyst, a certain amount of unstable constituents and generally a certain amount of unreacted monomers. To prepare from such crude polymers a material which can be satisfactorily processed from a melt it is necessary not only to remove unreacted monomers but also to wash out or render inactive the polymerization catalyst and to degrade and remove the unstable constituents of the chain and moreover to add stabilizers against heat and oxidation.

It is known that the unstable terminal oxymethylene portions in trioxane copolymers can be decomposed from the end of the chain inwards to the first —C—C— co-monomer unit by heating the copolymer with aqueous solutions in the presence or absence of organic solvents, particularly alcohols, or of trioxane, at temperatures of from 120° to 200° C., basic compounds such as ammonia, amines, alkali metal hydroxides, alkaline earth metal hydroxides, sodium carbonate or basic salts such as sodium acetate being added to the solutions.

It is a disadvantage of this process that secondary products such as formic acid formed during the treatment from the liberated formaldehyde may damage the copolymer by undesirable chain cleavage. It is therefore generally necessary to add the basic additive in large amounts although conversion of formaldehyde into formic acid is promoted by lareg amounts of alkali or amine. Another disadvantage of the process is that the copolymer thus treated is discolored and this becomes particularly evident when the copolymer is remelted. This discoloration cannot be wholly removed by washing.

It is known from UK Patent specifications Nos. 1,113,275 and 1,111,699 that discoloration of the copolymer which has occurred can be lessened by treating the copolymer with an aqueous solution in the pH range of from 10.0 to 10.5 with buffer solutions containing an amine and in some cases urea or melamine at from 100° to 160° C. It is a disadvantage of this expensive process that the copolymer has to be carefully washed after the treatment.

If an attempt is made to carry out hydrolytic degradation of the unstable portions of the chain of the copolymer without adding the basic substances or buffer systems hitherto used for the purpose, the reaction mixture is acidified by acid hydrolysis products and the copolymer undergoes chain cleavage. Depending on the reaction conditions used, this may result in complete destruction of the copolymer.

The present invention has for its object the provision of a solvent system which will effect removal of the unstable constituents mildly, economically and without any trouble.

We have found that the thermal stability of solid high molecular weight copolymers having terminal oxymethylene groups and derived from 90 to 99.5% by weight of trioxane and 0.5 to 20% by weight of compounds which are copolymerizable with trioxane and which in the copolymerization introduce along the polymer chain groupings having at least two adjacent carbon atoms in the polymer chain, can be improved particularly advantageously by degradation of unstable constituents of the copolymer by heating with aqueous solutions in the presence or absence of organic solvents and/or trioxane at temperatures of from 120° to 200° C. under superatmospheric pressure by using aqueous solutions which contain soluble salt-like fluorides of alkali metals and/or alkaline earth metals.

Solutions having a pH value of from 4.5 to 6.7 have particularly advantageous properties for the process according to this invention.

Examples of saline alkali metal and/or alkaline earth metal fluorides, which should be at least partly soluble in the reaction mixture under the reaction conditions, are sodium fluoride, potassium fluoride and sodium magnesium fluoride. The fluorides of the alkali metals are particularly suitable and of these sodium fluoride and potassium fluoride are preferred. The salts are added to the aqueous liquors used for the treatment advantageously in amounts of from 0.01 to 5%, particularly 0.1 to 3%, by weight with reference to the aqueous liquor. A pH value of 4.5 to 6.7 and particularly of 5.2 to 6.4 may be set up if necessary by adding suitable acids; strong acids which are stable under the reaction conditions are suitable, particularly for example sulfuric acid, phosphoric acid or formic acid.

The duration of the treatment depends on the temperature chosen (which is from 120° to 200° C. and preferably from 140° to 190° C.) and on the extent to which solvents or swelling agents for the copolymer are added to the aqueous solution. The duration is generally from thirty seconds to two hours and can quickly be determined by a small scale test under the conditions chosen. At temperatures above the melting point of the copolymer, i.e. generally at temperatures of from 160° to 190° C., complete degradation of the unstable constituents in the copolymer can be achieved at very short residence times (for example one to five minutes).

This process is therefore suitable for continuous operation and in a very suitable embodiment the treatment is carried out in a heated tube or cylinder provided with conveying and mixing means.

If a low temperature is preferred for reaction in heterogeneous phase, temperatures which are slightly below the sintering temperature of the copolymer used in the aqueous solution, which can easily be determined, are particularly advantageous. Thus a temperature of about 137° to 145° C. is suitable for example for a copolymer derived from 97% by weight of trioxane and 3% of dioxolane. Even although in this embodiment the treatment time is somewhat longer, it offers the advantage that the copolymer, which after the treatment is still solid, for example in the form of powder or granules, can easily be discharged from the apparatus used, for example a pressure tube, autoclave or stirred pressure vessel, and separated.

The ratio of copolymer to the aqueous liquor can be varied within wide limits in the reaction in heterogeneous phase. Weight ratios of copolymer to aqueous liquor of from 1:1 to 1:15 and particularly from 1:2 to 1:10 have proved to be advantageous.

It is possible to carry out the treatment with the aqueous solution in known manner with an addition of organic solvents and/or trioxane. Those organic solvents are preferred which dissolve or swell the copolymers at the temperatures and pressures (usually from 1 to 25 atmospheres) chosen for the treatment, alone or mixed with water. Organic solvents which are miscible with water are preferred, particularly alcohols having one to five carbon atoms such as methanol, n-propanol, isopropanol or glycol monoethyl ether. Fuller details of the choice of solvents and temperatures may be found in the literature.

The process according to the invention may be carried out in either a homogeneous or heterogeneous phase. For a reaction in a homogeneous phase the composition of the mixture of water and solvent is chosen so that the copolymer dissolves in the mixture at the intended reaction conditions (temperatures and pressure). This can readily be determined by experiment. In such cases it is preferred to use 5 to 30% by weight copolymer solutions. When these reaction conditions are chosen, a treatment time of about seven to fifteen minutes is generally adequate at temperatures of about 135° to 150° C. and a treatment time of about one half minute to five minutes at temperatures of from about 160° to 190° C. is generally adequate for effective removal of the unstable constituents of the copolymer. It is advantageous to carry out the reaction in homogeneous phase continuously, for example in heated tube systems, a pressure vessel or a cascade of pressure vessels. The copolymer is precipitated after the reaction, for example by simple cooling of the solution, depressurizing a system which is under pressure or by introduction into a precipitant and further processed by known methods.

Since oxymethylene polymers are susceptible to oxidation it is often advantageous, particularly when using high temperatures, to avoid unnecessary action of large amounts of air or oxygen during the treatment.

The process according to this invention may be carried out with all conventional thermoplastic solid high molecular weight copolymers of 80 to 99.5% and particularly 95 to 99.5% by weight of trioxane and 0.5 to 20% and particularly 0.5 to 5% by weight of compounds which are copolymerizable with trioxane and which introduce along the polymer chain groupings having at least two adjacent carbon atoms in the polymer chain. Examples of suitable copolymerizable compounds of the last mentioned type are cyclic ethers having the general formula:

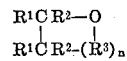

in which $R^1$ denotes a hydrogen atom, a lower alkyl radical or a lower haloalkyl radical, $R^2$ denotes a hydrogen atom, a lower alkyl radical or a lower haloalkyl radical and $R^3$ denotes a methylene or oxymethylene radical which may bear a lower alkyl radical or lower haloalkyl radical as a substituent and $n$ denotes one of the integers from 0 to 3, for example ethylene oxide, propylene oxide or epichlorohydrin, and particularly cyclic acetals of this type such as 1,3-dioxolane, 1,3-dioxane or 1,4-butanediolformal, and also diethylene glycol formal. Unsaturated cyclic acetals such as 1,4-butenediolformal, styrene, vinyl ethyl ether, cyclic thioethers such as ethylene sulfide or 1,3-oxthiolane are also suitable. Polyacetals are very suitable, particularly liner polyformals such as polydioxolane.

The process according to the invention has various advantages over prior art processes for improving the thermal stability of trioxane copolymers by degradation of unstable constituents by heating with aqueous solutions. Thus the copolymers treated in accordance with the process of the invention are not discolored and have a very high thermal stability. The process is very economical because the aqueous solutions used for the treatment may be used several times or recycled in a continuous process. This is attributable to the fact that the formaldehyde eliminated undergoes scarcely any chemical change in the aqueous liquor even at high temperatures. The eliminated formaldehyde may easily be separated from the aqueous liquor by distillation by depressurizing and recovered. It is of special advantage that an expensive washing of the treated copolymer can be dispensed with in the process according to this invention and copolymers containing fluoride do not discolor when melted.

The invention is illustrated by the following examples. The parts and percentages specified in the examples are by weight unless otherwise stated.

EXAMPLE 1

3 parts of a ground crude copolymer of 98.5 parts of trioxane and 1.5 parts of 1,3-dioxolane (which still contains 9.4% of residual monomers, 7 to 7.5% of unstable constituents and the polymerization catalyst (boron trifluoride)) is heated with 15 parts of aqueous potassium fluoride solution having the concentrations shown in the table in tubular pressure vessels to 180° C., kept at this temperature for about three minutes and cooled. The treated samples are separated from the liquor, sprayed with water for a short time and dried in vacuo at 80° C. After the yield of stable copolymer has been determined the samples are heated at 222° C. for two hours and the loss of weight which occurs is measured. The results are collected in the following table.

TABLE 1

| KF (percent) | Yield (percent) | Initial color | Loss (percent) | Final color |
|---|---|---|---|---|
| 0.5 | 82.7 | White | 0.7 | White. |
| 1.0 | 83.4 | ___do___ | 0.42 | Do. |
| 2.0 | 83.4 | ___do___ | 0.39 | Do. |

EXAMPLE 2

A suspension of 200 parts of a crude polymer of 97 parts of trioxane and 3 parts of 1,3-dioxolane in 1000 parts of a 1% aqueous solution of sodium fluoride and 2000 parts of glycol monomethyl ether is finely ground. The crude polymer contains 4 to 5% of trioxane, about 4% of unstable constituents and the polymerization catalyst (boron trifluoride etherate). The suspension is pumped at the rate of 2700 parts per hour through a pressure tube heated externally with circulating oil at 170° C. and which has a constant pressure device at the end. Residence time in the pressure tube is about five minutes. After having left the constant pressure device, precipitation of the copolymer having already commenced, the reaction mixture is introduced into water while stirring, followed by suction filtration and drying. A white copolymer is obtained in a yield of 90 to 91% (with reference to the crude polymer which is not discolored. In a test of stability, the treated polymer eliminates only 0.2 to 0.3% of formaldehyde within forty minutes at 222° C. under nitrogen, whereas a sample of the starting material which has been boiled up with a mixture of water and methanol containing sodium carbonate eliminates 3.5 to 4% of formaldehyde in the same treatment.

EXAMPLE 3

2000 parts of a 0.6% aqueous solution of sodium fluoride, 2000 parts of propanol and 400 parts of the same crude polymer as in Example 2 are heated for twenty minutes at 140° to 150° C. under the pressure corresponding to the said boiling point in a stirred autoclave. Prior to the heating, nitrogen is pumped in and allowed to escape several times. After this treatment the whole is cooled while stirring. The copolymer is precipitated in a finely particled form and separated from the liquor by suction filtration and dried. A yield of white copolymer of 90.7% with reference to the crude polymer is obtained; it undergoes a loss in weight of only 0.26% when heated for two hours at 222° C. under nitrogen. The intrinsic viscosity, i.e. the molecular weight of the polymer is practically unchanged by the treatment.

EXAMPLE 4

A ground crude copolymer which is substantially devoid of monomers, which has been prepared from 95.7 parts of trioxane and 2.5 parts of 1,3-dioxolane with 0.004 part of boron trifluoride dibutyl etherate as catalyst and which contains about 5% of unstable constituents and the polymerization catalyst is used in the following manner: 3 parts of the crude polymer is heated in a bomb tube at 180° C. with 12 parts of aqueous liquor having the content of sodium fluoride given in the table which has been adjusted to the pH value specified with 0.1 N aqueous sulfuric acid. After a treatment period of six and ten minutes the bomb tube is cooled and opened. The treated copolymer samples are sprayed with water and dried in vacuo at 80° C. After the yield has been determined, samples of the treated copolymers are heated for two hours at 222° C. while passing nitrogen over and the loss of weight is determined. The reaction conditions and the results are given in the following table which contains the following abbreviations.

NaF=sodium fluoride content of treatment liquor;
pH=pH value of treatment liquor; Time=time of treatment in minutes;
Yield=yield (percent) of treated copolymer;
Color=color of treated copolymer;
Loss=weight loss after two hours at 222° C. in percent.

TABLE 2

| NaF | pH | Time | Yield | Color | Loss |
|---|---|---|---|---|---|
| 2 | 6.4 | 6 | 94 | White | 0.37 |
| 2 | 6.4 | 10 | 94 | do | 0.28 |
| 1 | 5.8 | 6 | 93.3 | do | 0.4 |
| 1 | 5.8 | 10 | 93.9 | do | 0.35 |
| 0 | 6.2 | Comparative test 6 | 87.3 | do | 11.3 |
| 0 | 6.2 | Comparative test 10 | Almost completely destroyed | | |

EXAMPLE 5

1000 parts of a 0.6% aqueous solution of NaF and 1000 parts of glycol monomethyl ether are adjusted to a pH value of 6.5 with 0.1 N aqueous sulfuric acid. Then 300 parts of a ground crude copolymer of 97 parts of trioxane and 3 parts of 1,3-dioxolane is added which contains about 5% of trioxane and about 4% of unstable constituents in addition to the polymerization catalyst. The reaction mixture is heated at 140° to 145° C. while stirring, a pressure of 4.6 atmospheres gauge being set up. The batch is kept at this temperature and pressure for about twelve minutes and then cooled, the copolymer being thus precipitated in granular form. The copolymer is suction filtered, washed with water on the filter and dried in.

EXAMPLE 6

75 parts of methanol, 75 parts of water and 0.1 part of barium fluoride (BaF$_2$) are mixed with 50 parts of a crude ground polymer obtained by copolymerisation of 97% of trioxane and 3% of 1,3-dioxacycloheptane. Then the autoclave is pressured to 15 atmospheres with nitrogen and the contents are heated to 145° C. while stirring. When this temperature has been reached the contents are cooled to room temperature during approx. 30 minutes. The polymer which has precipitated from the solution is filtered off, washed with water and dried in vacuo at 100° C. When thermally tested under the conditions described in Example 1, the polymer thus treated shows a weight loss of 0.35%.

We claim:

1. A process for improving the thermal stability by degradation of unstable constituents of a solid high molecular weight copolymer containing terminal oxymethylene groups which comprises heating a copolymer of (a) 80 to 99.5% by weight of trioxane and (b) 0.5 to 20% by weight of a cyclic ether having the general formula:

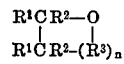

in which R$^1$ denotes a hydrogen atom, a lower alkyl radical or a lower haloalkyl radical, R$^2$ denotes a hydrogen atom, a lower alkyl radical or a lower haloalkyl radical and R$^3$ denotes a methylene or oxymethylene radical, or methylene or oxymethylene bearing a lower alkyl radical or lower haloalkyl radical as a substituent and $n$ denotes on of the integers from 0 to 3, or 1,4-butenediolformal, styrene, vinyl ethyl ether, ethylene sulfide, polydioxolane or 1,3-oxthiolane, which compounds (b) introduce along the copolymer chain during the copolymerization groupings having at least two carbon atoms adjacent to each other in the copolymer chain, in an aqueous liquor which contains 0.01 to 5% by weight, based on the aqueous liquor, of a soluble saline fluoride of an alkali metal and/or alkaline earth metal at 120–200° C. under superatmospheric pressure, and at a weight ratio of the copolymer to the aqueous liquor of 1:1 to 1:15, and cooling the solution to precipitate the copolymer.

2. A process as claimed in claim 1 wherein said aqueous solution has a pH value of 4.5 to 6.7.

3. A process as claimed in claim 1 wherein said saline fluoride is sodium fluoride.

4. A process as claimed in claim 2 wherein said saline fluoride is potassium fluoride.

5. A process as claimed in claim 1 wherein the time of said heating is thirty seconds to two hours.

6. A process as claimed in claim 2 wherein the time of said heating is thirty seconds to two hours.

7. A process as claimed in claim 1 wherein said temperature is 140° to 190° C.

8. A process as claimed in claim 2 wherein said temperature is 140° to 190° C.

9. A process as claimed in claim 1 wherein said saline solution contains as a water miscible organic solvent, an alkanol with 1–5 carbon atoms or glycol monomethyl ether.

10. A process as claimed in claim 2 wherein said saline solution contains as a water miscible organic solvent, an alkanol with 1–5 carbon atoms or glycol monomethyl ether.

References Cited

UNITED STATES PATENTS

| | | | |
|---|---|---|---|
| 3,174,948 | 3/1965 | Wall et al. | 260—67 |
| 3,225,005 | 12/1965 | Asmus et al. | 260—67 |
| 3,282,885 | 11/1966 | Schwartz et al. | 260—45.7 |

WILLIAM H. SHORT, Primary Examiner

L. M. PHYNES, Assistant Examiner

U.S. Cl. X.R.

260—67 FP, 73 R